Figure 1:
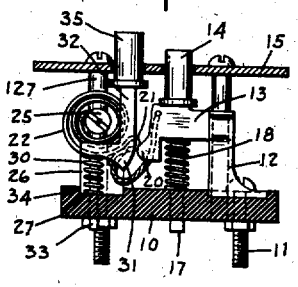

Mar. 13, 1923. Re. 15,562

R. H. MAPLE

THERMAL ELECTRIC CUT-OUT

Original Filed Nov. 20, 1914

INVENTOR.
ROY H. MAPLE.

BY Lockwood & Lockwood

ATTORNEYS.

Reissued Mar. 13, 1923. Re. 15,562

UNITED STATES PATENT OFFICE.

ROY H. MAPLE, OF INDIANAPOLIS, INDIANA, ASSIGNOR TO ROY H. MAPLE CO., OF INDIANAPOLIS, INDIANA, A CORPORATION.

THERMAL ELECTRIC CUT-OUT.

Original No. 1,261,256, dated April 2, 1918, Serial No. 873,216, filed November 20, 1914. Application for reissue filed April 22, 1921. Serial No. 463,612.

*To all whom it may concern:*

Be it known that I, ROY H. MAPLE, a citizen of the United States, and a resident of Indianapolis, county of Marion, and State of Indiana, have invented a certain new and useful Thermal Electric Cut-Out; and I do hereby declare that the following is a full, clear, and exact description thereof, reference being had to the accompanying drawings, in which like numerals refer to like parts.

The object of this invention is to provide a thermo-electric circuit breaker, or cut-out, which has a very few number of parts and is designed primarily for use on low voltage circuits, such as those used with battery illumination or battery ignition. This form of circuit breaker has a high momentary overload capacity for short periods of time; and in low voltage lamp circuits, the extremely low resistance of the filaments causes a heavy flow of current until they become sufficiently heated to cause a circuit breaker, not having the characteristics mentioned, to be set beyond this peak current load. The setting of a circuit breaker for this momentary overload would render it useless for smaller overloads, such as caused by grounds and partial short circuits. The type described in this application will operate successfully if any load above the normal is continued for any length of time.

Another feature of the invention consists in forming such a device, so that it will perform the above function and without changing circuits, as an ordinary switch. In this last mode of operation of the device the thermostat does not operate, although in the present instance the thermostat is connected in series with the regular load. In other words, the device operates as an ordinary switch when the thermostat is carrying the regular load. The free end of the thermostat cooperates with the movable switch member in making the circuit and another resetting movable member moves the free end of the thermostat out of engagement with the free end of the switch member for breaking the circuit. So this forms an ordinary "make" and "break" switch, and yet the circuit will be automatically broken on the occasion of temperature change influencing the thermostat. The device, therefore, is a combined thermostatic switch and manually operated switch.

Another important feature of the invention is the direct association of a series connected thermostat and a pair of switch members whereby the electrical connection between the same is such that the electrical circuit controlled by the switch will always be open between the switch members and never between the thermostat and the switch member directly associated with the thermostat.

The full nature of the invention will be understood from the accompanying drawings and the following description and claims.

Figure 2:
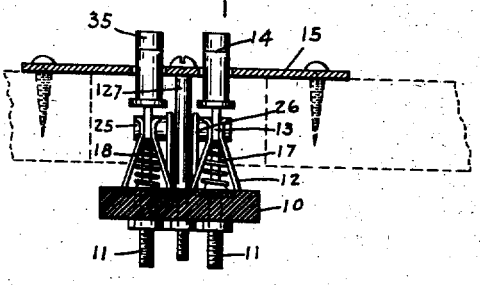
Figure 3:
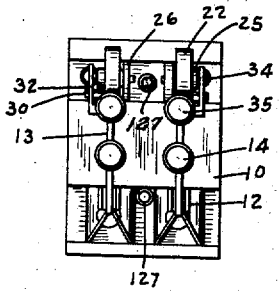
Figure 4:
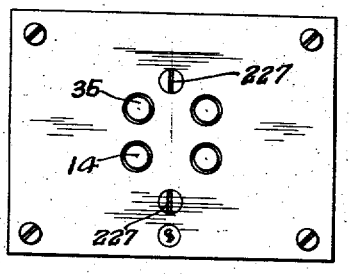
Figure 5:
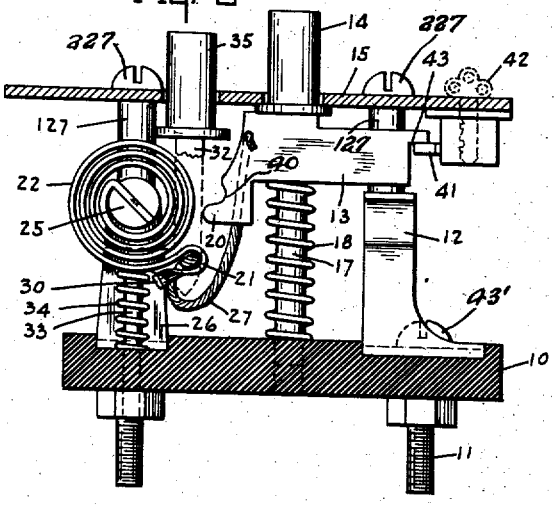
Figure 6:
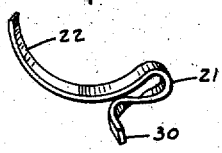

In the drawings, Fig. 1 is a side elevation of the switch with parts in circuit closing position and with parts in section. Fig. 2 is an elevation of the right hand end of Fig. 1 showing two switches and both switches closed and with parts in section. Fig. 3 is a plan view of the device shown in Fig. 2, with the top plate removed. Fig. 4 is a plan view of Fig. 2 including the top plate. Fig. 5 is a section like Fig. 1 of a modified form. Fig. 6 is a perspective view of the end of the thermal spring.

In the drawings herein shown there is a base plate 10 formed of hard rubber or other suitable insulation material and having in it a binding post 11 which also screws upon the plate 10. There is a spring or yielding switch member 12 consisting of a plate formed of spring metal and with two sides thereof bent upwardly and inwardly so as to press against each other normally and with the upper free ends spread away from each other somewhat to permit the entrance between them of the movable switch member 13 of the switch. This makes substantially a knife switch and may be made in any suitable form, as the invention is not limited to any particular construction of the switch members. The movable switch member 13, or knife blade, has secured to it a hard rubber or other suitable insulation push button 14 that reciprocates through a plate 15. It also has an inwardly extending arm or post 17 which is angular in cross section and extends through a correspondingly shaped hole in the base plate 10 and reciprocates therein. A spring 18 is located around the arm or post 17 and lies between the plate 10 and the switch member 13, and its function is to positively return or force outward said switch member after it has been forced inward and released. The switch member 13 has a nose or latch piece on it with a curved edge or surface, as shown in Fig. 1, adapted when the switch member 13 is pushed inward to pass below the free end 21 of a thermal strip 22 which constitutes a catch for the latch 20. When the switch member 13 is in such inward or closed circuit position, it will be held there in spite of the action of the spring 18, by said end 21 of the thermostat until said end of the thermostat is moved so as to release the latch 20, and then the spring 18 returns the switch member 13 to the open circuit position and breaks the circuit.

The thermal strip 22 is coiled about a horizontal arm 25 extending from a vertical stand 26. The horizontal arm is slotted to receive one end of the thermal strip. In the present instance the inner end of the thermal strip is so secured and then said strip is coiled about the arm. To simplify the construction, the free end of the strip is bent back on itself to enlarge said end and provide a curved surface and also provide engagement members for a trip member 35 on the end thereof for engaging the curved surfaces of the nose or latch 20 of the switch member 13. The end of the thermal strip is located so as to engage the nose of the switch member 13, and as the switch member 13 is pushed inward, the free end 21 of the thermal strip passes the point of the nose or latch 20 and engages the surface on the upper or outer sides.

From the foregoing it will be noted that there are two breaks in the circuit, one between the switch contact member or clips 12 and the knife blade 13, and the other between the free end 21 of the thermostat and the latch 20 of the switch blade member. Since normally the latter break point is the last to close the circuit and the last to open the circuit, said breaking point will ordinarily be the usual circuit breaking and making point, unless suitable means is provided to insure that the making and breaking of the resultant arcing thereof always will occur between the clips and the knife switch. Since in switches of the type illustrated, simplicity of construction is essential, and in the present instance said simplicity is attained by the direct connection of the thermostat with the knife blade, the engaging parts being complementarily formed as described. In switches of this type, it is desirable, therefore, to prevent arcing at the thermostat and knife blade connection, since said arcing soon would destroy both connecting portions and, thus, destroy the latching feature of the switch. Suitable shunt means, such as the pig tail 27 is provided to connect said thermostat and knife switch member substantially as shown in Fig. 1, and arranged so as not to interfere with the movement of the two members of said parts. While suitable shunt means may be provided, the pig tail preferably is used, since flexibility is secured, and the same makes the assembling of the switch easier. Another feature, when the pig tail or other flexible shunt means is used, is the securing of the same in the latch formed by the backwardly turned free end 21 of the thermostat.

The plates 10 and 15 are held spaced apart by suitable hollow posts or tubular spacing sleeves 127 and by suitable screws 227. The parts of the mechanism so far described operate as a thermostatic switch. In normal position, the circuit is broken. When, however, the switch member 13 is pushed inward, the parts assume the position shown in Fig. 1 and the circuit is closed by the knife edge of the member 13 entering between the spring contacts 12 and the thermal strip will hold the parts 12 and 13 in electrical connection until the thermal strip or expansible thermal member 22 is heated, causing it to expand and to some extent unwind, thus moving the end 21 of said thermal strip away from the nose 20 of the switch member 13. Thus, the switch member 13 returns to normal position under the action of the spring 18 and out of engagement with the spring contacts 12.

To enable said thermostatic device to be used also as an ordinary manually operated switch, there is a lateral projection 30 from the free end of the thermal strip in position to be engaged by a shoulder 31 and push rod 32 mounted in the plates 10 and 15. As shown in Fig. 6, projection 30 is preferably formed integral with the thermal strip, being an angular extension of the free and curved latch forming end 21. An extension 33 on said push rod 32 reciprocates in the base plate 10 and the push rod is returned by a spring 34 lying between the shoulder 21 and the plate 10.

Assuming that the switch has been operated so as to close the circuit by depressing the button 14 on the switch member 13, and it is desired to break the circuit manually, the push button 35 is operated by releasing the free end of the thermal strip so that it ceases to hold the switch member 13 in engagement with the contact springs 12. The spring 34 immediately returns the push button 35 to its normal position. In order that the free end of the thermal strip may more effectually engage and hold the switch member in circuit closing position, the switch member is provided with a notch 40 above its end and with a substantially regular curvature into which the bent free end of the thermal strip lies. The effect of this is that the notch provides a shoulder against which the free end of the thermal strip bears, so that when the strip is heated, said engaging end will move away from the switch member at a substantially right angle to the portion thereof with which it had been engaging.

Locking means is also provided, see Fig. 5, consisting of the laterally movable bolt 41 mounted in the casing adapted to be operated by any suitable key 142 or other permutation means, so that when the bolt is actuated, it will engage a notch 43 in the end of the switch member 13 and prevent its operation or movement.

The arm 26 is held in place and from turning by being made angular so as to have a lower plate that sets down in the recess 42 in the base 10 and is secured thereto by a screw 43′, as seen in Fig. 5.

While the invention has been described in considerable detail, it will be understood that many modifications thereof will readily suggest themselves to those skilled in the art to which this invention is applied, and said modifications are all considered to be within the broad purview of this invention as outlined by the appended claims.

The invention claimed is:

1. A thermal switch having two parallel separated plates in fixed relation with each other, a coiled thermal strip mounted between said plates and with one end thereof secured in fixed position and the other end thereof free, a contact between said plates and in fixed relation therewith and with said thermal strip, a push rod extending through said plates and arranged so as to be non-rotatable, a switch member secured on said push rod so as to be movable thereby into position to engage both the free end of said thermal strip and said contact, and a spring on said push rod for returning the same and the switch to normal outward position.

2. A thermal switch including a stationarily mountable plate, a spirally wound thermally expansible current carrying strip with its inner end in fixed relation to said plate, and the other end free to move when the strip is influenced by a change in temperature, a latch portion on the free end of said strip, a movable switch member engageable by said latch portion for normally holding said switch member in closed circuit position and for releasing the same therefrom when the thermal strip is expanded, and a spring for moving said switch member to the open circuit position after it has been released.

3. A thermal switch including a plate, a coiled thermal strip with one end secured in fixed relation to said plate, and the other end being free to move when the strip is influenced by a change in temperature, and switch mechanism including contact means and a movable switch member, the free end of said coiled strip engaging said movable switch member to normally close the circuit through the switch mechanism, said movable switch member when released by said free end being movable to open circuit position.

4. A switch including a pair of plates secured in fixed relation with each other, switch contact means positioned between said plates, a switch member slidably supported between said plates and movable into and out of engagement with said contact means, a catch upon said movable member and in the switch circuit, an expansible thermal member in the switch circuit, a latch for said catch and operable by said thermal member upon the passage of a predetermined current therethrough, circuit means between said latch and catch, whereby the circuit is opened at the switch contacts when the latch and catch are disassociated, and spring means to move said slidable switch member.

5. In a thermal switch, a movable switch member having a catch thereon, an expansible thermal member having one end stationarily secured and the other end free, said free end being bent back upon itself to form a latching portion for engaging said catch, and circuit means associating said movable switch member and said expansible thermal member when the switch is making or breaking the circuit therethrough.

6. In a thermal switch, a movable switch member having a catch thereon, an expansible thermal member having one end stationarily secured and the other end free, said free end including a loop to engage said catch, and circuit means secured to said movable switch member and secured to said expansible member in said loop.

7. In a thermal switch, a movable switch member having a catch thereon, an expansible thermal member having one end stationarily secured and the other end free, said free end including a loop to engage said catch, circuit means secured to said movable switch member and secured to said expansible member in said loop, said free end including an angular extension, and means cooperating with said angular extension to release the switch member from the thermal member.

8. In a thermal switch, a movable switch member having a catch thereon, an expansible thermal member having one end stationarily secured and the other end free, said free end including a loop portion for engaging said catch and an angular extension on said free end, and means to cooperate with said angular portion to release the switch member from the thermal member.

9. In a thermal switch, a movable switch member having a catch thereon, a thermally expansible current carrying member having one end stationarily secured and the other end free, said free end including a loop portion for engaging said catch and an angular portion on said free end, means to cooperate with said angular portion to release the switch member from the thermal member, and circuit means connecting said switch member and said thermal member when said switch member makes or breaks the circuit.

10. A thermal switch having a base plate, a thermal expansible member included in series in the switch circuit, a movable switch member, said thermal expansible member having one end rigidly supported upon said base plate, the free end of said thermal expansible member engaging said switch member to maintain the same in closed circuit position, and current carrying means permanently connected to said switch member and to the free end of the thermal member.

11. A thermal switch including supporting plate means, a thermal strip with one end secured to said plate means and the other end being free to move when the other is influenced by a change in temperature, a movable switch member normally held in closed position by the thermal strip, said movable switch member when released by the movement of the free end of said thermal strip being movable to the open circuit position, and means extending through said plate means for returning said switch member to the closed circuit position.

12. A thermal switch having a base, an overhanging arm projecting therefrom, a spiral thermal expansible member having its inner end rigidly secured to said arm and its free end positioned adjacent the base, a movable switch member, said free end and said switch member being movable upwardly from the base when said switch member is released from engagement with said thermal expansible member, and spring means for moving said movable switch member into open circuit position when released from engagement with the thermal expansible member.

13. A thermal switch including a pair of plates in fixed relation with each other, a thermal strip with one end in fixed relation with one of said plates and the other end free to move when the strip is influenced by a change in temperature, a latch portion on the free end of said strip, a movable switch member engageable by said latch portion for normally holding said switch member in closed circuit position and for releasing the same therefrom when the thermal strip is expanded, spring means for moving said switch member for the open circuit position after it has been released, and means extending beyond one of said plates for moving said switch member into associated relation with said thermal strip.

14. A thermal switch having a base, a thermal strip having one end secured in fixed relation to said base and the other end free, a switch member slidably and non-rotatably mounted upon said base and extending beyond the same, a contact, and a member for returning said switch member after it has been moved into engagement with the contact and when released by the expansion of said thermal strip.

15. A thermal switch having two separated plates in fixed relation with each other, a thermal strip mounted between said plates and with one end thereof secured in fixed relation with one of said plates and the other end free, a switch member slidably and non-rotatably mounted upon said plates and extending beyond the other plate, a contact between said plates, and a member for returning said switch member after it has been moved into engagement with the contact and when released by the expansion of said thermal strip.

16. A thermal switch having a coiled thermal strip in the circuit thereof, a movable switch closing member in position to be held closed by the free end of said thermal strip, a spring for returning said switch member after its release, and means for positively disengaging the free end of the thermal strip from said switch member.

17. A switch having a coiled thermal strip in the circuit thereof, a movable switch closing member in position to be closed by the free end of said thermal strip, a spring for returning said switch member after it is released, a push rod for disengaging the free end of the thermal strip from said switch member and releasing it, and means for returning said push rod.

18. A switch including a coiled thermal strip in the circuit thereof, a lateral projection near the free end of said strip, a movable switch member for closing the circuit and in position to be held closed by the free end of said thermal strip, a push rod for engaging the lateral projection from the thermal strip and moving it so as to release the switch member, and means for returning the switch member and push rod to normal position.

19. A switch including a coiled thermal strip in the circuit thereof, a lateral projection near the free end of said thermal strip, a movable switch member for closing the circuit and in position to be held closed by the free end of said thermal strip, a push rod for engaging the lateral projection from the thermal strip and moving it so as to release the switch member, and springs for returning the switch member and push rod to normal position.

20. A thermal switch having an arm, a thermal strip secured at one end to said arm and coiled about the same with the free end of said strip bent back on itself, and a movable switch member having an inwardly turned end provided with a curved notch into which said bent free end of the thermal strip is adapted to enter and hold the switch member closed, the parts being arranged so that the releasing movement of the free end of the thermal strip will be substantially at a right angle to the portion of the switch engaged thereby.

21. A thermal switch having two parallel separated plates in fixed relation to each other, a thermal strip mounted between said plates and with one end thereof secured in fixed position and the other end thereof free, a contact located between said plates, a switch member slidably and non-rotatably mounted in said plates in position to be moved into and out of engagement with the free end of said thermal strip and with said contact, and a spring for returning said switch member after it has been moved into such engagement.

22. A thermal switch having two parallel separated plates in fixed relation with each other, a coiled thermal strip mounted between said plates and with one end thereof secured in fixed position and the other end thereof free, a contact between said plates and in fixed relation therewith and with said thermal strip, a push rod extending through said plates and arranged so as to be non-rotatable, a switch member secured on said push rod so as to be movable thereby into position to engage both the free end of said thermal strip and said contact, and a spring on said push rod for returning the same and the switch to normal outward position.

In witness whereof, I have hereunto affixed my signature.

ROY H. MAPLE.